(12) United States Patent
Yang et al.

(10) Patent No.: US 11,296,721 B1
(45) Date of Patent: Apr. 5, 2022

(54) SYSTEM, APPARATUS, AND METHOD FOR CONTROLLING AN ELECTRONIC DEVICE

(71) Applicant: AAEON Electronics, Inc., Hazlet, NJ (US)

(72) Inventors: Bernard C. Yang, Edison, NJ (US); Michael Garcia, Corona, CA (US)

(73) Assignee: AAEON Electronics, Inc., Hazlet, NJ (US)

( * ) Notice: Subject to any disclaimer, the term of this patent is extended or adjusted under 35 U.S.C. 154(b) by 0 days.

(21) Appl. No.: 17/349,333

(22) Filed: Jun. 16, 2021

(51) Int. Cl.
*G06F 3/00* (2006.01)
*G06F 3/02* (2006.01)
*H03M 11/20* (2006.01)
*G06F 3/023* (2006.01)
*G07F 11/62* (2006.01)

(52) U.S. Cl.
CPC ............ *H03M 11/20* (2013.01); *G06F 3/023* (2013.01); *G07F 11/62* (2013.01)

(58) Field of Classification Search
None
See application file for complete search history.

(56) References Cited

U.S. PATENT DOCUMENTS

| | | | |
|---|---|---|---|
| 4,591,833 A | 5/1986 | Ishii | |
| 5,070,330 A | 12/1991 | Wu | |
| 5,760,714 A | 6/1998 | Zimmerman | |
| 2011/0172814 A1* | 7/2011 | Breitenbach | B67D 7/145 700/232 |
| 2012/0239189 A1* | 9/2012 | Jaud | G07F 9/023 700/236 |
| 2018/0300981 A1* | 10/2018 | Gaur | G06Q 20/18 |

* cited by examiner

*Primary Examiner* — Curtis A Kuntz
*Assistant Examiner* — Jerold B Murphy
(74) *Attorney, Agent, or Firm* — Stephen L. Keefe LLC

(57) ABSTRACT

An apparatus is disclosed. The apparatus includes a first controller including a plurality of contactors, each of the plurality of contactors configured to be selectively connected to a connector of a user interface, a plurality of electrical relays that are connected to the plurality of contactors, a second controller that is connected to the plurality of electrical relays, the plurality of electrical relays connected between the first controller and the second controller, and a user device or a network component that transfers control data to the second controller. The second controller controls the plurality of electrical relays to provide input to the first controller via the plurality of contactors based on the control data.

19 Claims, 14 Drawing Sheets

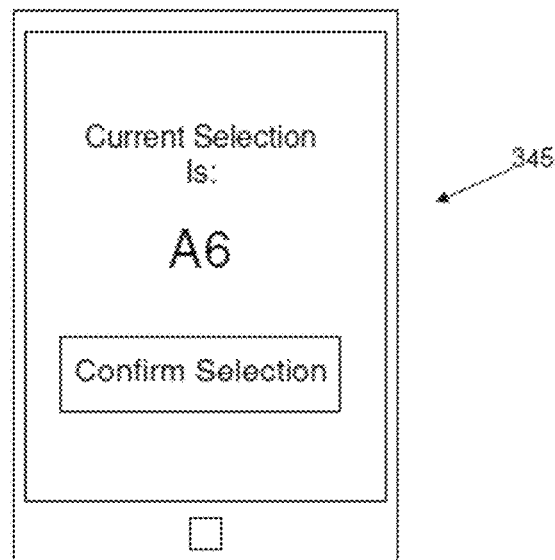

FIG. 6

RELAY DESIGNATION

| KEYPAD CHARACTER | C4 | C3 | C2 | C1 | R4 | R3 | R2 | R1 |
|---|---|---|---|---|---|---|---|---|
| 1 | energized | | | | | | | energized |
| 2 | | energized | | | | | | energized |
| 3 | | | energized | | | | | energized |
| A | | | | energized | | | | energized |
| 4 | energized | | | | | | energized | |
| 5 | | energized | | | | | energized | |
| 6 | | | energized | | | | energized | |
| B | | | | energized | | | energized | |
| 7 | energized | | | | | energized | | |
| 8 | | energized | | | | energized | | |
| 9 | | | energized | | | energized | | |
| C | | | | energized | | energized | | |
| * | energized | | | | energized | | | |
| 0 | | energized | | | energized | | | |
| # | | | energized | | energized | | | |
| D | | | | energized | energized | | | |

FIG. 7

| Key | Keypad Controller Pin Set 1 | Keypad Controller Pin Set 2 | Keypad Row | Keypad Column | Relay # Logical GPIO # |
|---|---|---|---|---|---|
| 1 | 1 | 8 | 1 | 2 | 1 |
| 2 | 1 | 7 | 1 | 1 | 2 |
| 3 | 2 | 8 | 2 | 2 | 3 |
| 4 | 2 | 7 | 2 | 1 | 4 |
| 5 | 3 | 8 | 3 | 2 | 5 |
| 6 | 3 | 7 | 3 | 1 | 6 |
| 7 | 4 | 8 | 4 | 2 | 7 |
| 8 | 4 | 7 | 4 | 1 | 8 |
| 9 | 5 | 8 | 5 | 2 | 9 |
| 0 | 5 | 7 | 5 | 1 | 10 |
| * | 5 | 10 | 5 | 4 | 11 |
| C/# | 5 | 9 | 5 | 3 | 12 |

| Key | Keypad Controller Pin Set 1 | Keypad Controller Pin Set 2 | Keypad Row | Keypad Column | Relay # Logical GPIO # |
|---|---|---|---|---|---|
| 1 | 1 | 8 | 1 | 2 | 1 |
| 2 | 1 | 7 | 1 | 1 | 2 |
| 3 | 2 | 8 | 2 | 2 | 3 |
| 4 | 2 | 7 | 2 | 1 | 4 |
| 5 | 3 | 8 | 3 | 2 | 5 |
| 6 | 3 | 7 | 3 | 1 | 6 |
| 7 | 4 | 8 | 4 | 2 | 7 |
| 8 | 4 | 7 | 4 | 1 | 8 |
| 9 | 5 | 8 | 5 | 2 | 9 |
| 0 | 5 | 7 | 5 | 1 | 10 |
| * | 5 | 10 | 5 | 4 | 11 |
| C/# | 5 | 9 | 5 | 3 | 12 |

FIG. 13

| Cell Row\Col | 1 | 2 | 3 | 4 | 5 |
|---|---|---|---|---|---|
| 1 | 1 | 2 | 3 | 4 | 5 |
| 2 | 6 | 7 | 8 | 9 | 10 |
| 3 | 11 | 12 | 13 | 14 | 15 |
| 4 | 16 | 17 | 18 | 19 | 20 |
| 5 | 21 | 22 | 23 | 24 | 25 |

FIG. 14

| Key | Keypad Controller Pin Set 1 | Keypad Controller Pin Set 2 | Mapped Row | Mapped Column | Relay # / Logical GPIO # |
|---|---|---|---|---|---|
| 1 | 1 | 8 | 1 | 2 | 2 |
| 2 | 1 | 7 | 1 | 1 | 1 |
| 3 | 2 | 8 | 2 | 2 | 7 |
| 4 | 2 | 7 | 2 | 1 | 6 |
| 5 | 3 | 8 | 3 | 2 | 12 |
| 6 | 3 | 7 | 3 | 1 | 11 |
| 7 | 4 | 8 | 4 | 2 | 17 |
| 8 | 4 | 7 | 4 | 1 | 16 |
| 9 | 5 | 8 | 5 | 2 | 22 |
| 0 | 5 | 7 | 5 | 1 | 21 |
| * | 5 | 10 | 5 | 4 | 24 |
| C/# | 5 | 9 | 5 | 3 | 23 |

FIG. 15

SYSTEM, APPARATUS, AND METHOD FOR CONTROLLING AN ELECTRONIC DEVICE

TECHNICAL FIELD

The present disclosure generally relates to a system, apparatus, and method for an electronic device, and more particularly to a system, apparatus, and method for controlling an electronic device.

BACKGROUND

Conventional techniques for using vending machines often involves a user physically entering input data by using a keypad or similar arrangement. Keypads are ubiquitously used for interacting with numerous electronic devices, including vending machines. Most keypad implementations utilizing keypad controllers use row-and-column scanning techniques to detect pressed keys. In these keypad types, each key, when pressed, connects a row position and a column position together. For example, conventional vending machines typically include a keypad or a plurality of buttons that users press to make a desired selection of food or goods. Other conventional devices such as computing devices, electronic door locks, machinery, and vehicles such as cars and aircraft also often involve a user physically entering input data by using a keypad or similar arrangement.

Retrofitting conventional devices such as vending machines and other types of devices such as those discussed above is often expensive and time-consuming. For example, retrofitting conventional vending machines to include relatively new types of payment methods such as contactless payment methods is typically burdensome from both a cost and labor perspective. Further, conventional retrofit methods often still involve a user inputting instructions by a keypad disposed on the retrofitted vending machine in conjunction with making payment such as contactless payment.

Accordingly, conventional retrofit methods are typically expensive and time-consuming while still involving physical pressing of a keypad or button by a user. Users may thereby still make a mistake in pushing the wrong button of a conventional vending machine because they may not have an opportunity to review or confirm their selections. Further, by still involving physical pressing of button on a device, conventional devices open up users to an increased probability of disease (e.g., virus) infection based on touching a keypad or other input device that many other users touch. Also, numerous users pressing keypads may spread disease for example during pandemic conditions.

Further, retrofitting conventional devices including vending machines for better functionality is often difficult and expensive.

The exemplary disclosed system, apparatus, and method are directed to overcoming one or more of the shortcomings set forth above and/or other deficiencies in existing technology.

SUMMARY OF THE DISCLOSURE

In one exemplary aspect, the present disclosure is directed to an apparatus. The apparatus includes a first controller including a plurality of contactors, each of the plurality of contactors configured to be selectively connected to a connector of a user interface, a plurality of electrical relays that are connected to the plurality of contactors, a second controller that is connected to the plurality of electrical relays, the plurality of electrical relays connected between the first controller and the second controller, and a user device or a network component that transfers control data to the second controller. The second controller controls the plurality of electrical relays to provide input to the first controller via the plurality of contactors based on the control data.

In another aspect, the present disclosure is directed to a method. The method includes controlling an assembly using a first controller, selectively connecting a user interface connector of a user interface of the assembly to a terminal of the first controller, selectively connecting a relay connector of an electrical relay assembly to the terminal of the first controller, connecting the electrical relay assembly to a second controller so that the electrical relay assembly is selectively connected between the first controller and the second controller, and controlling the electrical relay assembly with the second controller to provide input to the first controller when the user interface connector is disconnected from the terminal and the relay connector is connected to the terminal.

BRIEF DESCRIPTION OF THE DRAWINGS

FIG. 6 illustrates a schematic view of at least some exemplary embodiments of the present disclosure;

FIG. 7 illustrates a control schematic view of at least some exemplary embodiments of the present disclosure;

FIG. 13 illustrates a control schematic view of at least some exemplary embodiments of the present disclosure;

FIG. 14 illustrates a control schematic view of at least some exemplary embodiments of the present disclosure; and FIG. 15 illustrates a control schematic view of at least some exemplary embodiments of the present disclosure.

DETAILED DESCRIPTION AND INDUSTRIAL APPLICABILITY

Figures 1, 1A:
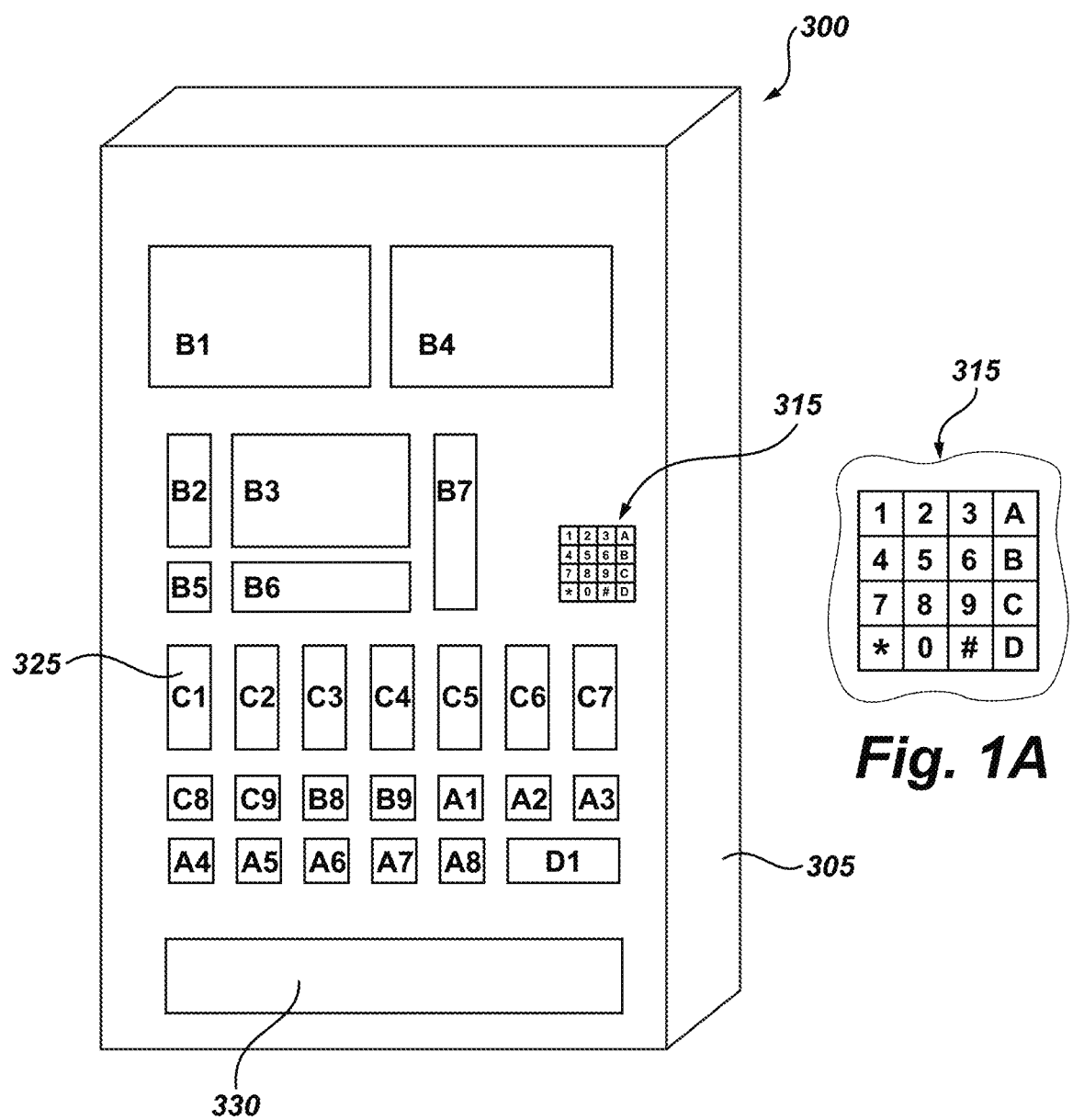
FIG. 1 illustrates a perspective view of at least some exemplary embodiments of the present disclosure.
FIG. 1A illustrates a schematic view of at least some exemplary embodiments of the present disclosure.
Figure 2:
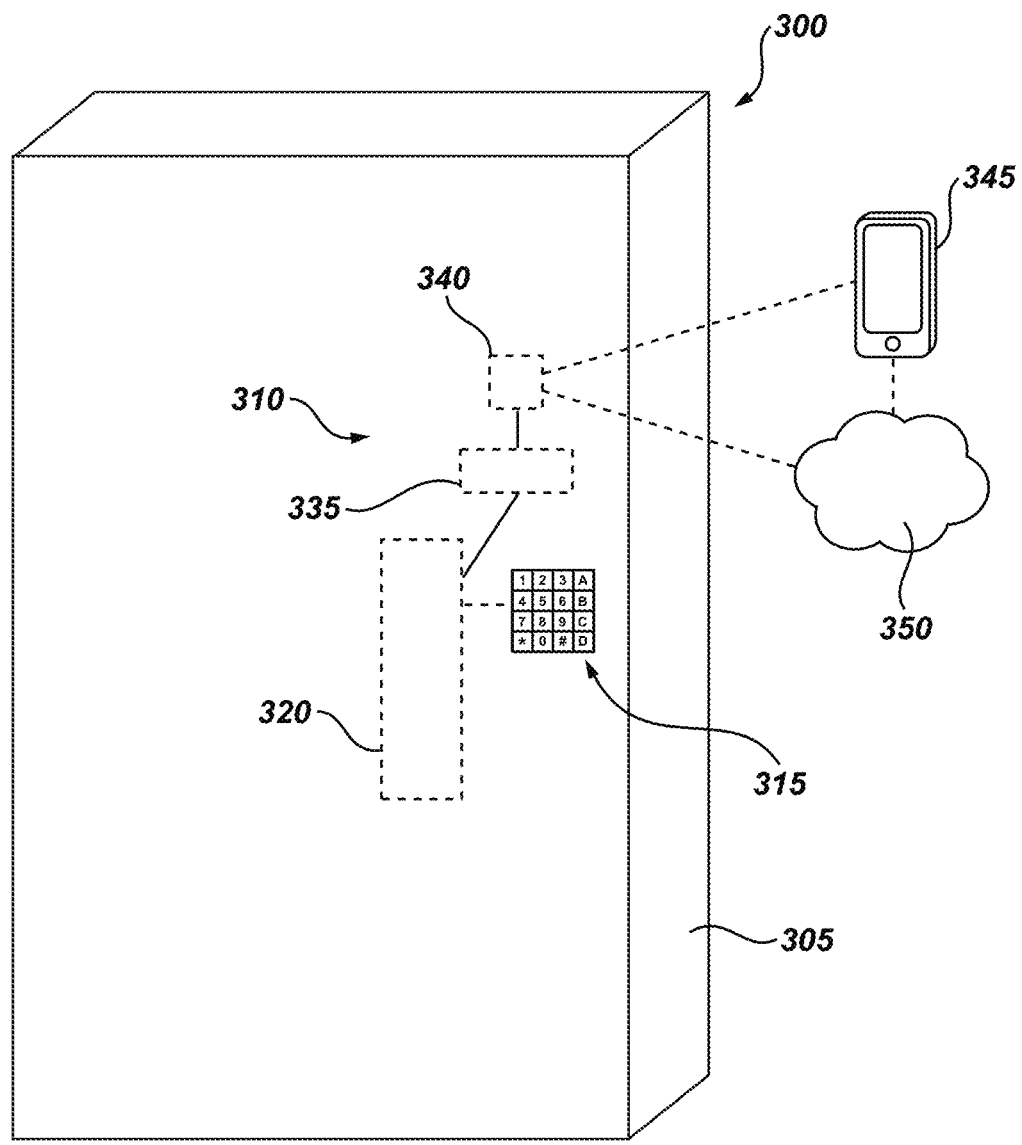
FIG. 2 illustrates a schematic view of at least some exemplary embodiments of the present disclosure.

The exemplary disclosed system, apparatus, and method may provide for control of an electronic device. In at least some exemplary embodiments and as illustrated in FIGS. 1 and 2, the exemplary disclosed system, apparatus, and method may include a system 300. System 300 may include one or more assemblies 305 and one or more control systems 310. Control system 310 may be disposed within (e.g., entirely in), partially within, at a surface of, or attached to assembly 305.

Assembly 305 may be any suitable device for being controlled by control system 310. Assembly 305 may be an electronic device or a machine. For example, assembly 305 may be a vending machine. Also for example, assembly 305 may be an arcade game, a computing device (e.g., a computer having a keypad or a keyboard), an electronic door lock, a component of machinery having a user input device, a portion of a vehicle having a user interface (e.g., a car, fixed wing aircraft such as a jet or airplane, rotary wing aircraft such as a helicopter, or maritime vessels such as a boat), or any other suitable device that receives input based on a user pressing, touching, turning, sliding, or making any other tactile control of a device.

As illustrated in FIGS. 1 and 2, assembly 305 may include a user interface 315 and a controller 320. In at least some exemplary embodiments, user interface 315 may be removably attachable to controller 320.

User interface 315 may be any suitable device for tactile manipulation by a user. For example as illustrated in FIG. 1A, user interface 315 may be a keypad (e.g., numbered keypad) including buttons that may be pressed by a user. In at least some exemplary embodiments, user interface 315 may be a touchscreen device, a keyboard (e.g., a computer keyboard), and/or an assembly including movable members (e.g., buttons, knobs, slidable or rotatable switches, dials, levers, and/or any other suitable mechanical component). In at least some exemplary embodiments, user interface 315 may include audio components for receiving and/or emitting vocal commands and sounds. User interface 315 may also include one or more biometric devices (e.g., a fingerprint device and/or facial recognition device).

Controller 320 may control an operation of assembly 305. Controller 320 may be any suitable computing device for controlling an operation of assembly 305. Controller 320 may, for example, include components similar to the components described below regarding FIG. 8. Controller 320 may include for example a processor (e.g., micro-processing logic control device) or board components. Also for example, controller 320 may include input/output arrangements that allow it to be connected (e.g., via wireless, Wi-Fi, Bluetooth, or any other suitable communication technique) to other components of system 300. For example, controller 320 may control an operation of assembly 305 based on input received from an exemplary disclosed module of system 300 (e.g., as described below). Controller 320 may communicate with components of system 300 via direct (e.g., wire communication), wireless communication, Wi-Fi, Bluetooth, network communication, internet, and/or any other suitable technique.

Assembly 305 may include a plurality of components 325. In at least some exemplary embodiments, components 325 may be cavities covered by transparent material such as glass for exhibiting items for sale (e.g., any suitable food, beverages, or any suitable goods such as candy, soda, travel goods, and electronics). In at least some exemplary embodiments, items for sale may be dropped from components 325 to a component 330 that may be a dispensing area. As illustrated in FIGS. 1 and 1A, components 325 may be labeled with markings (e.g., labeled with numbers and/or letters) that may correspond to characters displayed on user interface 315. For example when assembly 305 may be a vending machine, components 325 may be marked with combinations of characters that are disposed on members (e.g., buttons) of user interface 315.

As illustrated in FIG. 2, control system 310 may include a relay assembly 335 and a controller 340. Relay assembly 335 may be electrically connected to controller 320 and controller 340.

Controller 340 may include components that may be generally similar to controller 320. Controller 340 may control an operation of relay assembly 335 as described for example herein. Controller 340 may communicate with components of system 300 and/or components that operate in conjunction with system 300 such as a user device 345 and a network component 350. Network component 350 may be a WAN such as, for example, described below regarding FIG. 9. Network component 350, user device 345, and/or controller 340 may communicate with each other and/or any other suitable component of control system 310 and assembly 305 (e.g., controller 320) via any suitable communication method such as, for example, wireless communication (e.g., CDMA, GSM, 3G, 4G, and/or 5G), direct communication (e.g., wire communication), Bluetooth communication coverage, Near Field Communication (e.g., NFC contactless communication such as NFC contactless payment methods), radio frequency communication (e.g., RF communication such as short-wavelength radio waves, e.g., UHF waves), and/or any other desired communication technique. Controller 340 may thereby receive and transmit data from user device 345 and/or network communication 350 for controlling relay assembly 335.

User device 345 may be any suitable user device for receiving input and/or providing output (e.g., raw data or other desired information) to a user. User device 345 may be, for example, a touchscreen device (e.g., a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user device or interface designed to work specifically with other components of system 300, and/or any other suitable user device or interface. For example, user device 345 may include a touchscreen device of a smartphone or handheld tablet. For example, user device 345 may include a display that may include a graphical user interface to facilitate entry of input by a user and/or receiving output. For example, system 300 may provide notifications to a user via output transmitted to user device 345. User device 345 may also be any suitable accessory such as a smart watch, Bluetooth headphones, and/or other suitable devices that may communicate with components of system 300 (e.g., controller 340).

Figure 3A:
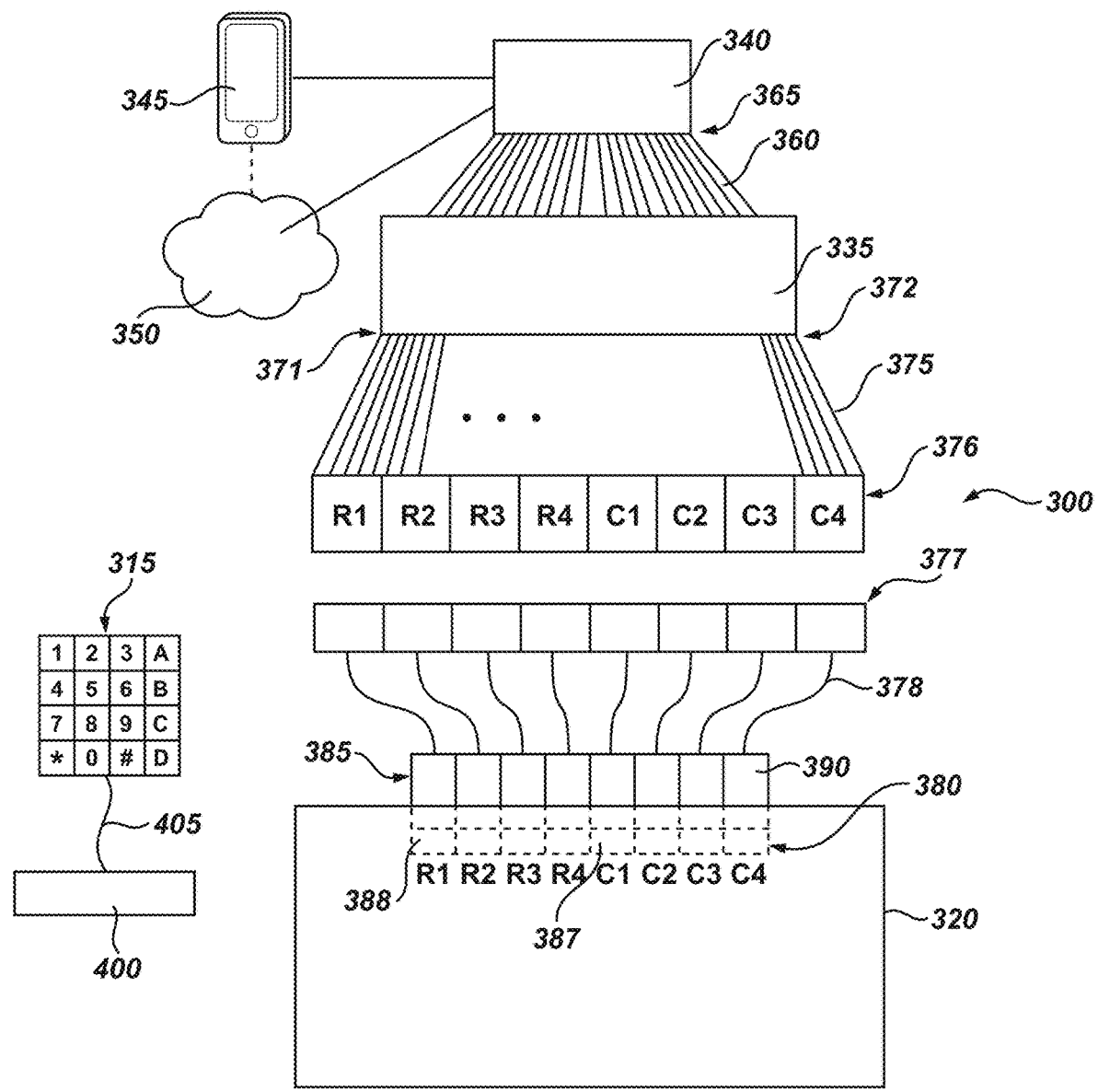
FIG. 3A illustrates a schematic view of at least some exemplary embodiments of the present disclosure.
Figure 3B:
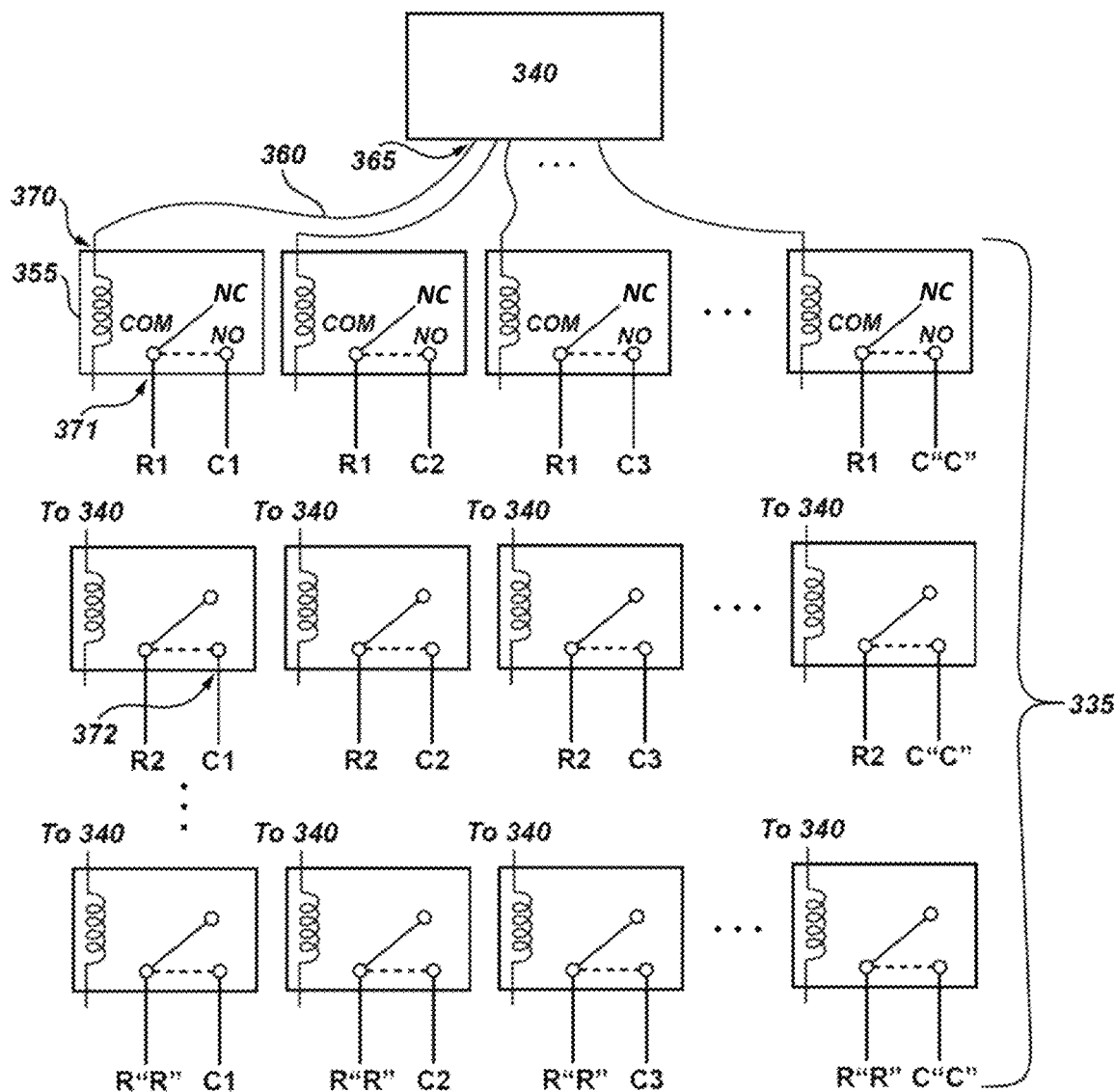
FIG. 3B illustrates a schematic view of at least some exemplary embodiments of the present disclosure.

In at least some exemplary embodiments and as illustrated in FIG. 3A, relay assembly 335 may be directly electrically connected between controller 340 of control system 310 and controller 320 of assembly 305. Relay assembly 335 may be for example an electrical switch assembly that may be controlled by controller 340. Relay assembly 335 may include a plurality of relays 355 as illustrated in FIG. 3B. Relay assembly 335 may include a suitable number of relays. Relays 355 may be electromagnet relays and/or a solid-state relays. Relays 355 may be similar to and/or used with any of the exemplary embodiments described herein.

Relay 355 may be any suitable type of switch. Relay 355 may be any suitable relay or switching device that may be controlled by controller 340. Relay 355 may be an electric relay. Relay 355 may be any suitable electric switching device. For example, relay 355 may be an electrical relay, an electromagnetic relay, a solid state relay, an electromechanical relay, a hybrid relay, a reed relay, or a thermal relay. In at least some exemplary embodiments, each relay 355 may be a relay having any desired number of poles and throws. For example, relay 355 may include e.g., one or more single pole single throw (SPST) relays, single pole double throw (SPDT) relays, double pole single throw (DPST) relays, and/or double pole double throw (DPDT) relays. Relay 355 may be a relay of any desired voltage such as 5 volt, 12 volt, 24 volt, or any other desired voltage (e.g., between 9 volts DC and 24 volts DC).

As illustrated in FIG. 3B, each relay 355 may be electrically connected to controller 340 via an electrical connector 360. Electrical connector 360 may be any suitable electrical conductor such as, for example, a trace on a PCB, an electrical wire or cable. A first end portion of each electrical connector 360 may be electrically connected to a terminal 365 of controller 340. Terminal 365 may include for example a general purpose outlet (GPO) of controller 340 such as a digital output. A second end portion of each electrical connector 360 may be electrically connected to a control input 370 of a corresponding relay 355.

Each relay 355 may provide for electrical switching between an open and a closed position. For example, each relay 355 may include NO (e.g., normally open) and/or NC (e.g., normally closed positions) terminals. For example, FIG. 3B illustrates an exemplary open position of relay 355 as a non-dashed line and an exemplary closed position of relay 355 as a dashed line. In at least some exemplary embodiments, relay 355 may be controlled by controller 340 via corresponding electrical connector 360, terminal 365, and control input 370 to selectively move between and open and closed position. Reference numeral 371 may indicate a common terminal in a relay. Reference numeral 372 may indicate an NO terminal in a relay.

FIG. 14 illustrates an exemplary layout mapping for the plurality of relays 355. The table represents the keypad scanning row and column positions. Each table cell corresponds to a designated relay 355 in relay assembly 335. Each relay, when activated by control input 370, will connect the corresponding scanning row and column together. For example, relay #10, when activated, will connect scanning row #2 and scanning column #5.

FIG. 3B illustrates an exemplary embodiment of relay connection configuration. Terminal 371 of relay 355 may be connected to a scanning row position, and terminal 372 may be connected to a scanning column position. Alternatively, Terminal 371 may be connected to a scanning column position, and terminal 372 may be connected to a scanning row position.

Each relay 355 may be electrically connected to controller 320 via an electrical connector 378. A first end portion of each electrical connector 378 may be electrically connected to a terminal 380 of controller 320. Terminal 380 may for example include a plurality of contactors or pins 388 for contacting and/or receiving first end portions of electrical connectors 378. In at least some exemplary embodiments, first end portions of electrical connectors 378 may be housed in a connector assembly 385. For example, connector assembly 385 may be removably received in a cavity 387 of terminal 380. Alternatively in at least some exemplary embodiments, each first end portion of one or more electrical connectors 378 may be housed in a connector 390. A plurality of connectors 390 may be removably received in cavity 387. For example, each connector 390 may be electrically connected to corresponding contactor or pin 388 of terminal 380. In at least some embodiments, terminal 380 may include any suitable contacts (e.g., protruding contacts) for electrically connecting terminal 380 to electrical connectors 378. For example, electrical connectors 378 may be electrically connected to terminal 380 by any suitable technique. A second end portion of each electrical connector 378 may be electrically connected to a common terminal portion 371 or NO terminal 372 of corresponding relays 355, as illustrated in FIG. 3A.

Figures 10, 11:
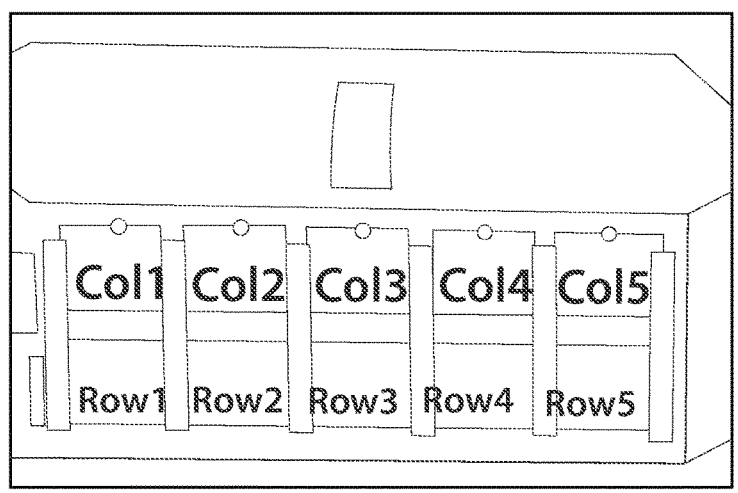
FIG. 10 illustrates a control schematic view of at least some exemplary embodiments of the present disclosure.
FIG. 11 illustrates a perspective view of at least some exemplary embodiments of the present disclosure.

As illustrated in FIG. 3A, reference numeral 375 may indicate an electrical connector between relay terminals and a row/column connector terminal (e.g., a quantity of electrical connector 375 may be the product of the number of rows and the number of columns). Reference numeral 376 may indicate a row/column connector terminal (e.g., similar to as illustrated in FIG. 11). Reference numeral 377 may indicate an end of an electrical connector that may connect to connector terminal 376.

In at least some exemplary embodiments, terminal 380 may be a keypad connector disposed on controller 320 that may include or be a keyboard controller. Connector assembly 385 may be configured (e.g., sized and/or shaped) similarly to a connector assembly 400 that may be electrically connected to user interface 315 via an electrical connector 405. Connector assembly 400 may be similar to connector assembly 385, and electrical connector 405 may include one or more electrical connectors that may be similar to electrical connector 378. In at least some exemplary embodiments, electrical connector 405 may be a harness that selectively electrically connects pins of user interface 315 (e.g., pins of buttons of user interface 315 that may be a keypad) to controller 320 based on connector assembly 400 being removably received in cavity 387 of terminal 380.

Connector assembly 385 and connector assembly 400 may be interchangeably received in cavity 387 of terminal 380. For example, an operator or a technician (e.g., during retrofit) may remove connector assembly 400 from cavity 387 and place connector assembly 385 in cavity 387 (e.g., and vice versa). Connector assembly 385 and connector assembly 400 may thereby be interchangeably placed in cavity 387 so that electrical contactors or pins 388 of terminal 380 of controller 320 may be selectively electrically connected to electrical connectors 378 (e.g., when connector assembly 385 is received in cavity 387) or electrical connector 405 (e.g., when connector assembly 400 is received in cavity 387).

Figure 4A:
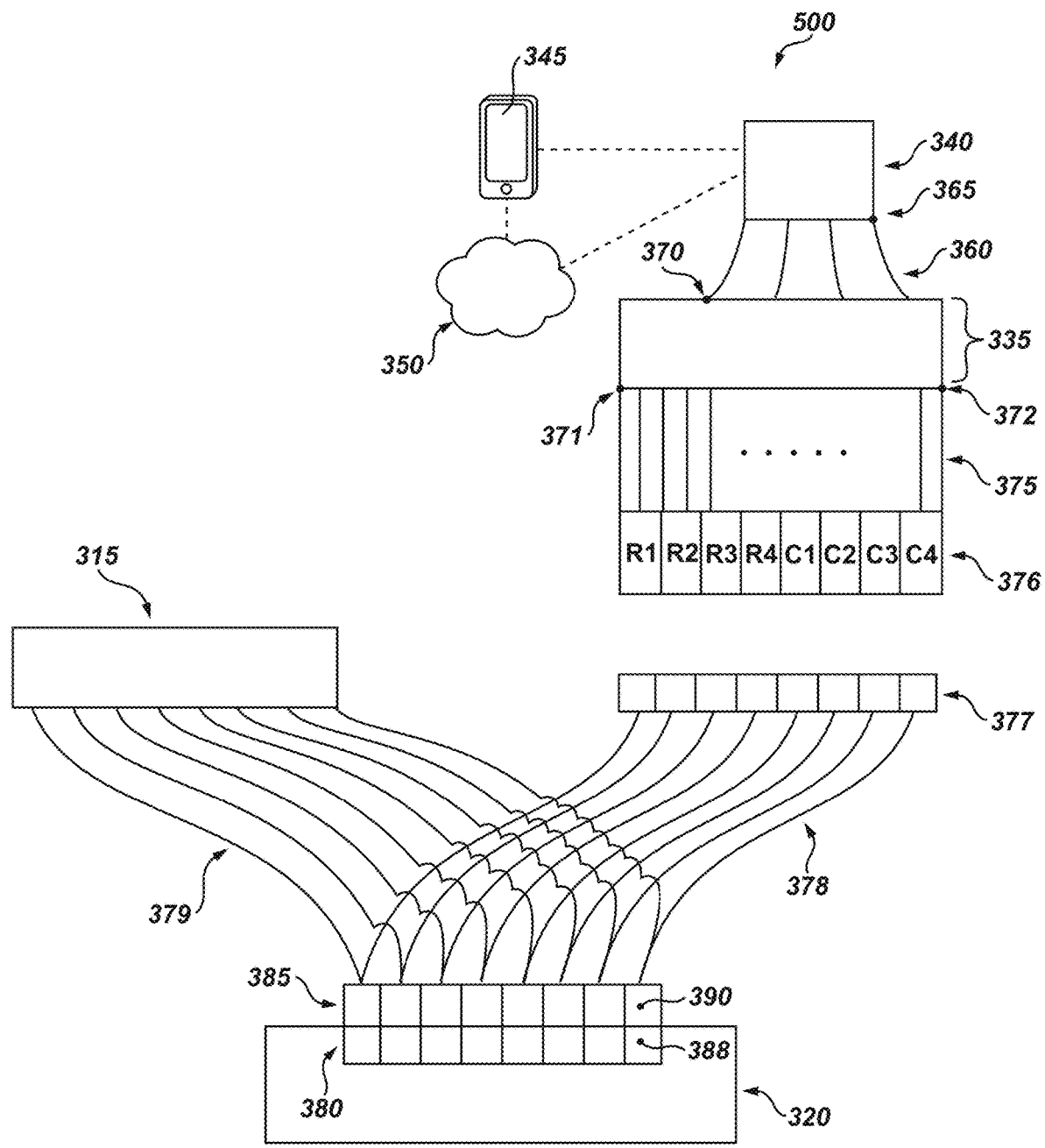
FIG. 4A illustrates a schematic view of at least some exemplary embodiments of the present disclosure.

System 500 in FIG. 4A illustrates an alternative exemplary embodiment of system 300. Connector assembly 385 may accommodate electrical connections 378 from row/column terminals 377 as well as electrical connectors 379 from the original user interface 315. These connectors may be configured such that the electrical connectors 378 and 379 both terminate at the same corresponding pin 388, which represents a specific scanning row/column. These may be arranged such that both the user interface 315 and controller 340 may be used to send input to controller 320 via terminal 380.

System 300 may include one or more modules that may be partially or substantially entirely integrated with one or more components of system 300 such as, for example, controller 340, user device 345, one or more network components 350, and/or any other desired component of system 300 (e.g., controller 320). The one or more modules may be software modules as described for example below regarding FIG. 8. For example, the one or more modules may include computer-executable code stored in non-volatile memory. The one or more modules may also operate using a processor (e.g., as described for example herein). The one or more modules may store data and/or be used to control some or all of the exemplary disclosed processes described herein.

Components of system 300 may be formed from any suitable materials for controlling an electronic device such as, for example, Polycarbonate (PC), Barium (e.g., $BaSO_4$), silicone material, polymer material, structural metal (e.g., structural steel), co-polymer material, textile material, thermoplastic and thermosetting polymers, resin-containing material, polyethylene, polystyrene, polypropylene, epoxy resins, phenolic resins, Acrylanitrile Butadiene Styrene (ABS), Mix of ABS and PC, Acetal (POM), Acetate, Acrylic (PMMA), Liquid Crystal Polymer (LCP), Mylar, Polyamid-Nylon, Polyamid-Nylon 6, Polyamid-Nylon 11, Polybutylene Terephthalate (PBT), Polycarbonate (PC), Polyetherimide (PEI), Polyethylene (PE), Low Density PE (LDPE), High Density PE (HDPE), Ultra High Molecular Weight PE (UHMW PE), Polyethylene Terephthalate (PET), PolPolypropylene (PP), Polyphthalamide (PPA), Polyphenylenesulfide (PPS), Polystyrene (PS), High Impact Polystyrene (HIPS), Polysulfone (PSU), Polyurethane (PU), Polyvinyl Chloride (PVC), Chlorinated Polyvinyl chloride (CPVC), Polyvinylidenefluoride (PVDF), Styrene Acrylonitrile (SAN), Teflon TFE, Thermoplastic Elastomer (TPE), Thermoplastic Polyurethane (TPU), and/or Engineered Thermoplastic Polyurethane (ETPU), or any suitable combination thereof.

The exemplary disclosed system, apparatus, and method may be used in any suitable application involving physical pressing or touching of an input device (e.g., keypad, button, or any other input device) by a user. For example, the exemplary disclosed system, apparatus, and method may be used in vending machines, arcade games, computing devices (e.g., computers having a keyboard), electronic door locks, machinery having user input devices, vehicles such as cars, aircraft, and boats, or any other suitable device that receives input based on a user pressing, touching, turning, sliding, or making any other tactile control of a device.

Figure 5:
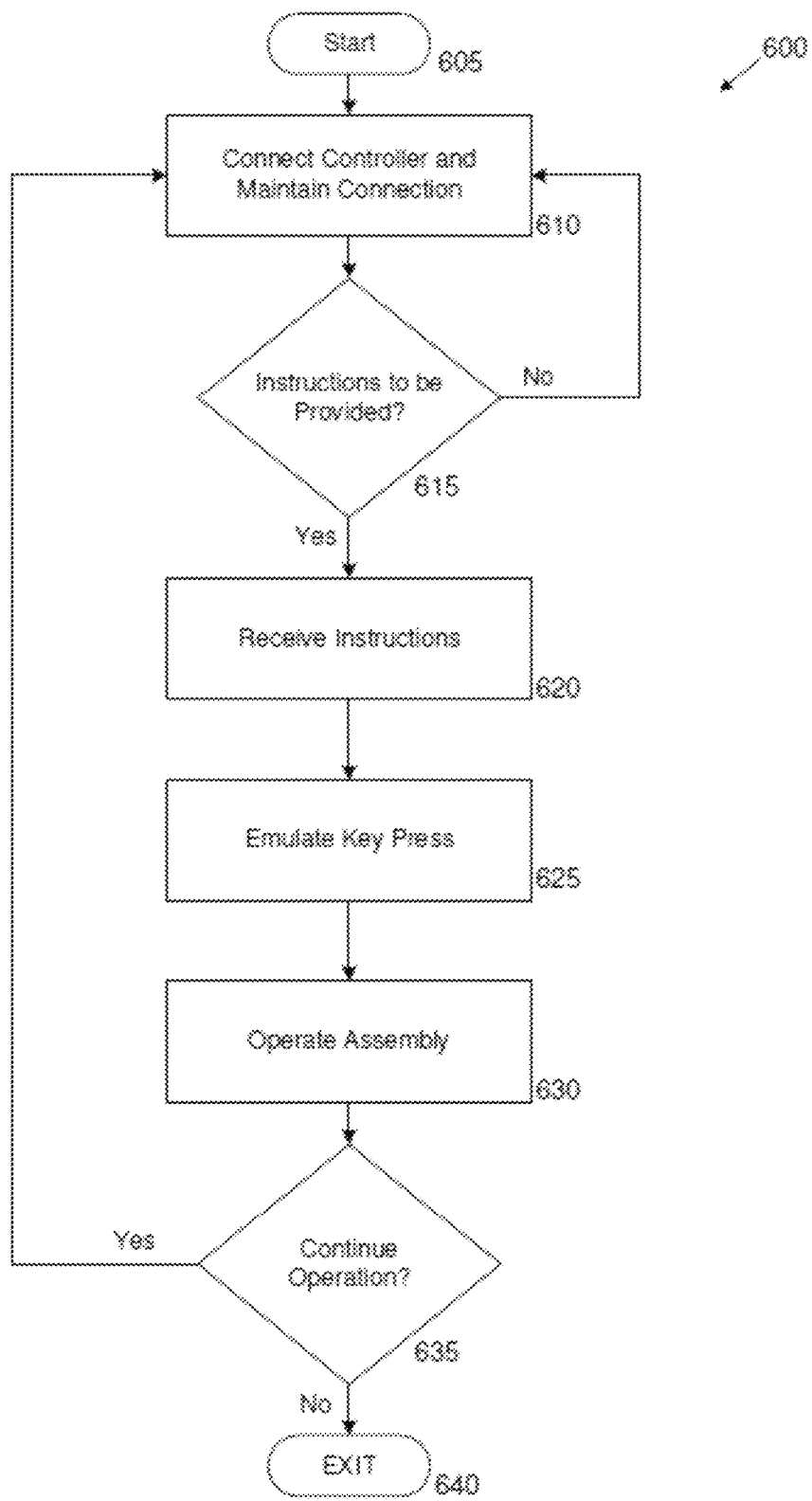
FIG. 5 illustrates an exemplary process of at least some exemplary embodiments of the present disclosure.

FIG. 5 illustrates an exemplary operation or algorithm of the exemplary disclosed system 300. Process 600 begins at step 605.

At step 610, controller 340 may be electrically connected to controller 320 and/or the connection between controller 340 and 320 may be maintained. In at least some exemplary embodiments and prior to step 610, user interface 315 may be electrically connected to controller 320 based on connector assembly 400 being received in cavity 387 of terminal 380. Accordingly for example, prior to step 610, input of a user provided to user interface 315 may control controller 320 (e.g., input such as input signals provided based on a user pressing members of user interface 315). In at least some exemplary embodiments (e.g., when assembly 305 is a vending machine), a user may push buttons of user interface 315 corresponding to a desired product displayed in component 325. For example as illustrated in FIGS. 1 and 1A, the user may press button "A" followed by button "6" on user interface 315, which causes assembly 305 to drop the desired product from component 325 labeled "A6" to component 330.

A user or operator (e.g., a maintenance technician or any other desired personnel) may remove connector assembly 400 from cavity 387 of terminal 380. The user or operator may then insert connector assembly 385 into cavity 387. Controller 340 may thereby be electrically connected to controller 320 via terminal 365, electrical connector 360, relays 355, electrical connectors 375, terminal 376, terminal 377, electrical connector 378 and connector assembly 385. Alternatively in at least some exemplary embodiments, connector assembly 385 may already be received by and connected to terminal 380 prior to steps 605 and 610. Electrical connectors 378 may be connected to terminal 380 using any suitable technique in addition to and/or alternatively to connector assembly 385 being received in cavity 387.

System 500 may be similarly connected at step 610 as described above for system 300.

At step 615, system 300 (e.g., or system 500) determines whether or not instructions are to be provided. If no instructions are to be provided, system 300 (e.g., or system 500) returns to step 610. If system 300 (e.g., or system 500) determines that instructions are to be provided (e.g., based on signals and/or data received from user device 345 and/or network component 350), process 600 proceeds to step 620.

At step 620, system 300 receives instructions. In at least some exemplary embodiments, user instructions may be provided from user device 345 and/or network component 350 to controller 340 via any suitable communication technique (e.g., such as the exemplary disclosed communication techniques described above). For example, a user may provide instructions to system 300 (e.g., to controller 340) based on inputting data to user device 345 (e.g., using an app of user device 345 that may be a smart device such as a smart phone or tablet, or any suitable application programming interface or API). The user may provide the instructions (e.g., input data) directly from user device 345 to controller 340 and/or communication via network component 350. Instructions or input data may also be provided directly to controller 340 from network component 350. Instructions or input data or input signals may be provided to controller 340 using any suitable technique such as, for example, the exemplary techniques described herein. In at least some exemplary embodiments, process 600 may then proceed to step 625.

In at least some exemplary embodiments, a user may have an opportunity to review the instructions or input data provided to controller 340 prior to process 600 continuing. For example (e.g., as illustrated in FIG. 6), following entry of input data by the user to user device 345, an app or API being used by the user may request that the user confirm the entered data before process 600 continues. This exemplary step may allow a user to prevent assembly 305 from being operated based on incorrectly inputted data or instructions. For example in the case that assembly 305 is a vending machine, the user may enter "A6" into an app or API of user device 345 (e.g., a smart phone, tablet, or other mobile device). In at least some exemplary embodiments as illustrated in FIG. 6, the app or API may then display an image and/or text requesting the user to confirm the selection (e.g., "A6"). In at least some exemplary embodiments, when the user confirms the selection, process 600 proceeds to step 625.

Controller 340 of system 500 may receive instructions at step 620 similarly to as described above for system 300. In addition, user input may be provided to system 500 via a user physically entering instructions to user interface 315. Instructions (e.g., input signals and/or data) may thereby be provided via the electrical connections from controller 340 and/or user interface 315 to controller 320 as described for example herein. Accordingly, instructions may be provided by system 500 via user interface 315 (e.g., by a user pressing buttons of user interface 315) and/or user communication with controller 340 (e.g., via user device 345 and/or network component 350).

At step 625, system 300 (e.g., or system 500) may emulate a key press of user interface 315. For example, controller 340 provides input (e.g., input signals and/or data) to controller 320 that corresponds to input (e.g., is identical to input signals and/or data) that would have been provided by user interface 315 (e.g., if connector assembly 400 had been received in cavity 387).

Controller 340 controls relays 355 to move between an open position (e.g., illustrated as a non-dashed line in FIG. 3B) and a closed position (e.g., illustrated as a dashed line in FIG. 3B). In at least some exemplary embodiments, controller 340 may emulate a key press (e.g., corresponding to a user pressing a button of user interface 315 if connector assembly 400 had been selectively received in cavity 387) by controlling one or more relays 355 via corresponding electrical connectors 360 to move from the open position (e.g., non-dashed line illustrated in FIG. 3B) to the closed position (e.g., dashed line illustrated in FIG. 3B). Alternatively for example, controller 340 may emulate a key press by moving one or more relays 355 from a closed position to an open position. For example, controller 340 may control one or more relays 355 to move, be energized, actuate, or operate in any other suitable manner to provide input to controller 340 that emulates a key press. Based on the above-described control of relays 355 by controller 340, instructions or data (e.g., input signal or input data) may be transferred via electrical connectors 375, terminals 376 and 377, and electrical connectors 378 from one or more relays 355 to controller 320 via connector assembly 385 based on control of relays 355 (e.g., of relay assembly 335) by controller 340. For example, controller 340 may control relays 355 of relay assembly 335 to provide input (e.g., input signals or input data) to terminal 380 of controller 320 that may correspond to (e.g., be identical to) input signals or input data that is provided to controller 320 by user interface 315 when connector assembly 400 is received in cavity 387. Accordingly in at least some exemplary embodiments, the same input (e.g., input data or input signals) may be provided to controller 320 regardless of whether connector assembly 400 connects user interface 315 to terminal 380 or whether connector assembly 385 connects controller 340 to terminal 380. For example in doing so, controller 340 may emulate key pressing of user interface 315 by a user in providing input to controller 320. For example, controller 340 may control relay assembly 335 to emulate key press signal pin connection. Accordingly in at least some exemplary embodiments, input may be provided to controller 320 by controller 340 as though user interface 315 that may be a keypad was connected to controller 320. System 300 may thereby achieve an effect of a keypress on a keypad without a user physically pressing the keypad.

Figure 4B:
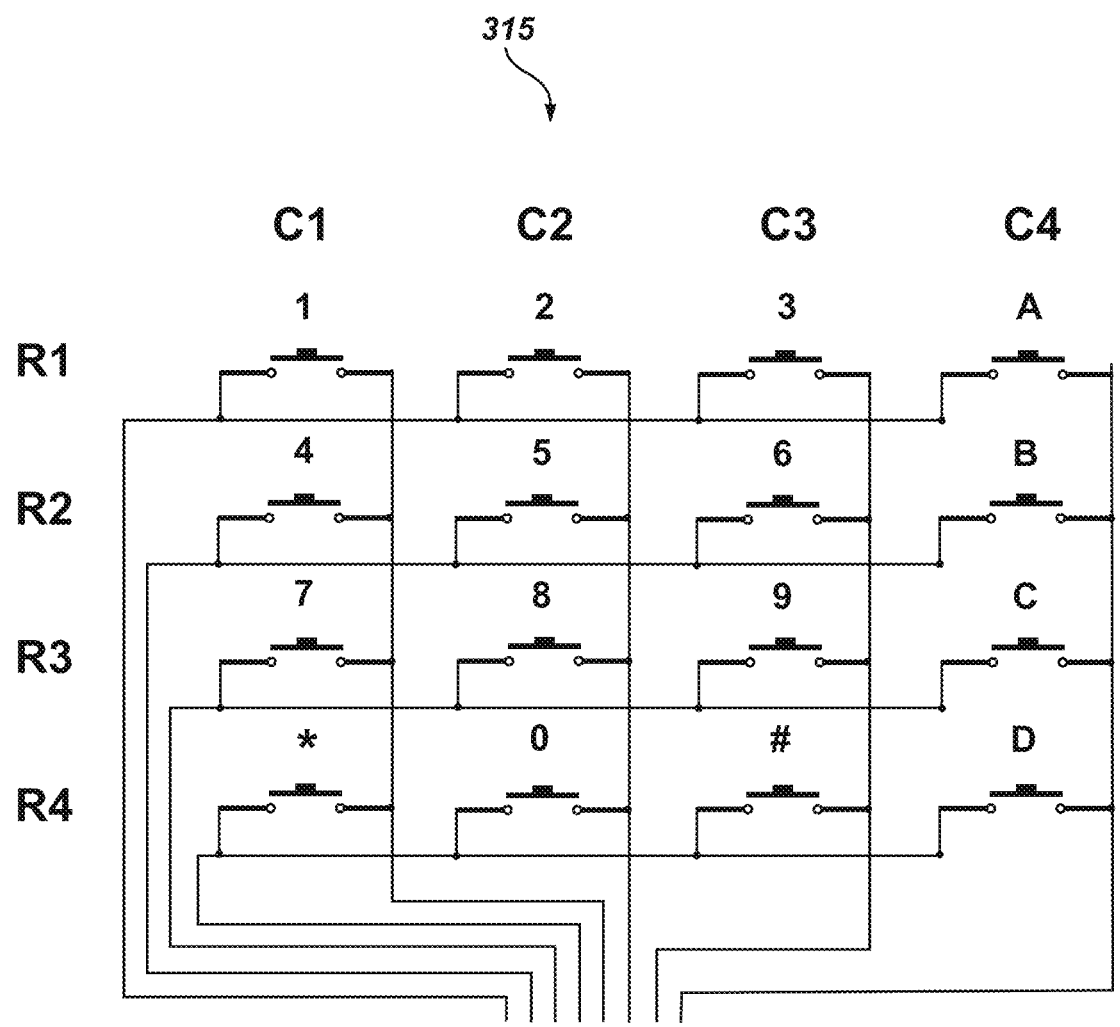
FIG. 4B illustrates a schematic view of at least some exemplary embodiments of the present disclosure.

In at least some exemplary embodiments, relays 355 may emulate a keypad operation based on each relay 355 being assigned by the exemplary disclosed software module of system 300 to the designated combination of a scanning column and scanning row of a keypad. For example as illustrated in FIG. 4B, user interface 315 may be a 4×4 keypad having a first row R1 (e.g., including characters "1" "2" "3" and "A"), a second row R2 (e.g., including characters "4" "5" "6" and "B"), a third row R3 (e.g., including characters "7" "8" "9" and "C"), and a fourth row (e.g., including characters "*" "0" "#" and "D"). The columns of the exemplary keypad may also include a first column C1 (e.g., including characters "1" "4" "7" and "*"), a second column C2 (e.g., including characters "2" "5" "8" and "0"), a third column C3 (e.g., including characters "3" "6" "9" and "#"), and a fourth column C4 (e.g., including characters "A" "B" "C" and "D"). User interface 315 may also have any other suitable keypad configuration (e.g., 4×3 having R1-R4 and C1-C3, 3×3 having R1-R3 and C1-C3, or any other desired configuration) having any desired number of rows or keys.

Any suitable row and column combination may be assigned by the software module to relays 355. For example, the software module of system 300 may provide for the selection of a desired character of user interface 315 as illustrated in FIG. 7. FIG. 7 illustrates an exemplary assignment (e.g., control mapping) of relays 355 to characters of an exemplary keypad configuration of user interface 315. For example as illustrated in FIGS. 3B and 7, the exemplary selection of "A6" described above may be provided by controller 340 by activating (e.g., as described above) a relay 355 connected to both C1 and R1 to input "A" and then by activating a relay 355 connected to both C2 and R2 to input "6" to controller 320. As another example, a selection of "B4" may be provided by controller 340 by activating a relay 355 connected to both C1 and R2 to input "B" and then by activating a relay 355 connected to both C4 and R2 to input "4" to controller 320. Any suitable configuration of user interface 315 may be similarly assigned or mapped to relays 355 as illustrated in FIGS. 3B and 7. In at least some exemplary embodiments, user interface 315 may operate using similar assignments and mapping as controller 340.

Each relay 355 may be connected to a set of corresponding contactors or pins 388 of terminal 380 via a set of electrical connectors 378. For example as illustrated in FIG. 3B, relay 355 that is connected to "R1" at COM terminal 371 and "C1" at NO terminal 372 may be connected to contactors or pins 388 mapped or designated to receive R1 input and C1 input, respectively. For example as illustrated in FIG. 3A, terminal 380 may include a plurality of contactors or pins 388 configured to receive respective inputs R1-R4 and C1-C4.

Returning to FIG. 5, at step 630, assembly 305 may operate according to the input provided at step 625. Controller 320 may control assembly 305 based on input provided by controller 340. For example, assembly 305 may operate to dispense a product stored at component 325 labeled "A6" based on the exemplary disclosed selection of A6 by a user at step 620 and controller 340 operating to provide input (e.g., input data or input signal) corresponding to "A6" as described above. For example as described above, system 300 (e.g., or system 500) may operate assembly 305 based on controller 340 emulating a key press of a user interface that may be provided to controller 320 (e.g., without a user actually pressing user interface 315). Also as described above, system 500 may operate assembly 305 based on a user pressing user interface 315.

At step 635, system 300 (e.g., or system 500) may determine whether or not operation should continue, for example based on user input (e.g., via user device 345 and/or network component 350), a predetermined time period, predetermined algorithms, and/or any other suitable technique. If system 300 (e.g., or system 500) determines that operation will be continued, process 600 returns to step 610. If system 300 (e.g., or system 500) determines that operation will not be continued, process 600 ends at step 640.

FIGS. 10 and 11 illustrate an another exemplary embodiment of the exemplary disclosed system, apparatus, and method, which may provide software-controlled emulation of pressing a key on a keypad. The exemplary disclosed embodiment of FIGS. 10 and 11 may be combined with the exemplary disclosed features of the above exemplary embodiments. The exemplary embodiment of FIGS. 10 and 11 may include components and operate with components that may be similar to the exemplary embodiments described above. The exemplary disclosed system, apparatus, and method may include a plurality of electrical relays, a plurality of signal sources for controlling the relays, and an interface connector with a plurality of positions to connect to a harness (e.g., that may be similar to electrical connector 405) that may connect to a keypad controller connector for example as described herein. The exemplary disclosed relays, signal sources, interface connector, and harness (e.g., custom harness) may be connected for example as described herein. The exemplary disclosed relays may be electromagnet relays or solid-state relays (e.g., may be similar to relay 355). Each relay may be turned on or off via a control signal, individually. Each relay may include two or more contact terminals that may be connected together when the relay is turned on. Each relay's control signal may be provided by a signal source. The signal source may provide proper voltage on demand to provide (e.g., effect) a binary result of either "turned ON" or "turned OFF" for the relay receiving the signal. For example, a 5 VDC relay may turn on if its control terminal receives a 5 VDC input, and turn off when the control terminal receives no voltage. In at least some exemplary embodiments, the exemplary disclosed system, apparatus, and method may include a number of relays and a same number of signal sources, wherein each of the relays may be controlled by one distinct signal source. The number may range from 1 to any suitable number. For example, 25 relays and control signal sources may be provided to interface with an exemplary disclosed keypad. Each signal source may be independently controlled via the exemplary disclosed software. For example, digital GPIO (General-Purpose Input/Output) may be used as the signal sources.

In at least some exemplary embodiments, the exemplary disclosed system, apparatus, and method may include an interface connector comprising a plurality of positions wherein a suitable size terminal may fit inside each position to provide electrical contacts. The terminals may be of the male type (a "Pin") or a female type (a "Socket"). The number of positions may be the product of the (e.g., maximum) number of rows and the (e.g., maximum) number of columns of the target keypad configuration (e.g., or greater than the sum of the number of rows and columns).

In at least some exemplary embodiments, the exemplary disclosed system, apparatus, and method may provide for routing of a plurality of paths that may provide connections between the interface connector positions to the contact terminals of the relays for example as described below. These interface connector positions may be divided into two groups: Row and Column. For example, an interface connector with 10 positions may have 5 Row positions and 5 Column positions. Each exemplary disclosed relay may be assigned as a node of a matrix having a same number of rows and columns as that of the interface connector positions (e.g., as Row and Column accordingly). For example, using an interface connector having 5 Row positions and 5 Column positions, 25 relays may be assigned as Relay(1,1), Relay(1, 2), . . . , to Relay(5, 5) using the notation of (Row #, Column #). The interface connector positions and the relay contact terminals may connect to each other in the following manner. Each interface connector Row position may be connected to one contact terminal of relays at nodes with the same row number. For example, interface connector Row 1 position may connect to Relay(1, 1), Relay(1, 2), Relay(1, 3), Relay(1, 4), and Relay(1, 5) for a 5-Column configuration. Each interface connector Column position may be connected to the other available contact terminal of relays at nodes with the same column number. For example, interface connector Column 1 position may connect to Relay(1, 1), Relay(2, 1), Relay(3, 1), Relay(4, 1), and Relay(5,1) for a 5-Row configuration. For an interface connector with R+C positions, where R is the number of Row positions and C is the number of Column positions, the connection arrangement may make R×(multiply) C connections to R×C relays. For example, the interface connector may make connections to 25 relays using the same 10 interface connector positions divided into 5 row positions and 5 column positions example.

In at least some exemplary embodiments, the exemplary disclosed system, apparatus, and method may include a harness (e.g., that may be similar to electrical connector 405) for connection between the exemplary disclosed interface connector and a target keypad controller connector, as described as follows. The harness may have at least two connectors: one to the interface connector, and the other to the keypad controller connector. Each harness connector may have compatible housing and terminals for mating with a designated connector. The harness may also include an additional connector connected (e.g., daisy-chained) to the keypad controller connector end. This additional connector may be a same type as the exemplary disclosed keypad controller connector, and may provide accommodation for preserving the original keypad to keypad controller connection.

In at least some exemplary embodiments, the exemplary disclosed system, apparatus, and method may include wire connections between the exemplary disclosed harness connectors. A suitable number (e.g., a minimum number) of wires included may be the product of the number of rows and number of columns that may be utilized for representation for keys (e.g., all keys) on the target keypad (e.g., or greater than the sum of the number of rows and columns). A target keypad controller connector's representation of pin connection for each key may be obtained. These may be expressed as two sets of pins on the keypad controller connector. The target keypad's row/column mapping for each key may also be obtained. For example, as illustrated in the mapping table of FIG. 10, the key "7" may be represented by connecting pin 4 and pin 8 of keypad controller connector together. For example, pin 4 may be Row 4 and pin 8 may be Column 2.

In at least some exemplary embodiments, the exemplary disclosed system, apparatus, and method may provide for a mapping table for a target keypad to be created using the following method: List keys (e.g., all keys) on target keypad as the first column of the table; then list the keypad controller connector's first set of pins ("Pin Set 1") for each key in the first table column as the next column in the table; then list the keypad controller connector's second set of pins ("Pin Set 2") for each key in the first table as the next column in the table; then list the keypad row representation for each key in the first table column as the next column in the table; and then list the keypad column representation for each key in the first table column as the next column in the table. Then for example, harness wire connections between the interface connector end and the keypad controller end may be determined (e.g., each interface connector end position may be either a Row position or Column position) as follows: For a Row position, find the corresponding Keypad Row in the table then look up the value of Pin Set 1 in the same table row (e.g., this may be the position at the keypad controller connector end to connect to); and For a Column position, find the corresponding Keypad Row in the table then look up the value of Pin Set 2 in the same table row (e.g., this may be the position at the keypad controller connector end to connect to).

In at least some exemplary embodiments, the exemplary disclosed system, apparatus, and method may provide a method of arranging connections to the keypad controller to achieve an equivalent of physically pressing a specific key on a keypad on demand as follows: Add a column for the signal sources ("Relay #/Logical GPIO #") that control the relays to the mapping table with value starting with 1 on table row 1, then 2 on row, and so on to the last table row (e.g., this may provide reference of a key and its corresponding signal source for all keys); and To effect a specific key press emulation, turn on the signal source for the key using the mapping table (for example, a software app turns on a GPIO for the key, e.g., by setting GPIO #7 to HIGH state to emulate pressing the "7" key).

In at least some exemplary embodiments, the exemplary disclosed system, apparatus, and method may provide software-control emulation of physical key press on a keypad.

Figure 12:
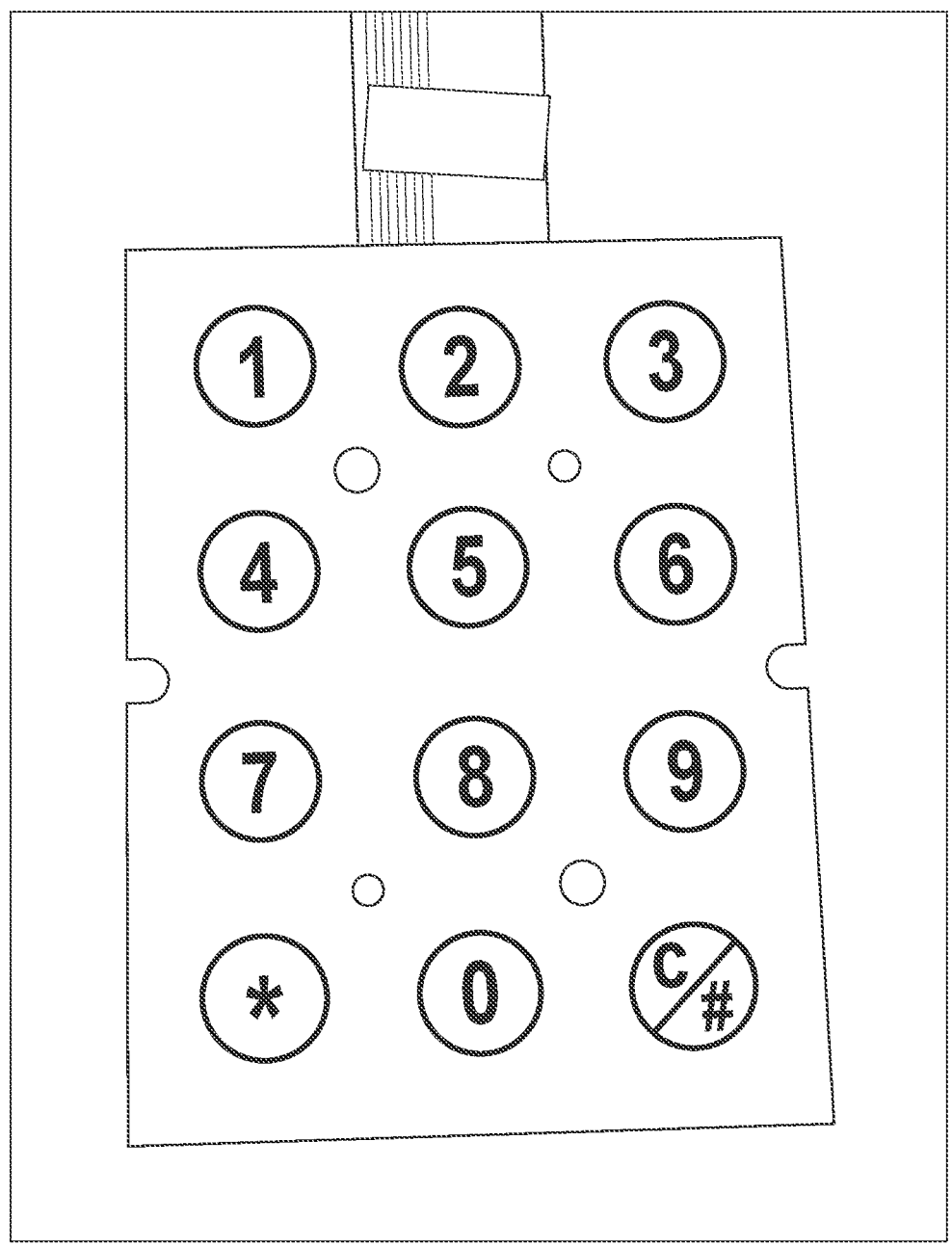
FIG. 12 illustrates a front view of at least some exemplary embodiments of the present disclosure.

FIGS. 12 and 13 illustrate another exemplary embodiment of the exemplary disclosed system, apparatus, and method. FIGS. 12 and 13 illustrate an exemplary keypad that includes four rows and three columns. The number of electrical connectors used for the exemplary keypad may be nine (e.g., more than the sum of 4+3). The nine connectors may be assigned as five row connectors and four column connectors. Also for example, the connectors may be assigned as 4 row connectors and 5 column connectors and the control signals to the relays may be adjusted accordingly. FIG. 13 illustrates the 9 electrical connectors for the exemplary keypad of FIG. 12. For example, FIG. 13 illustrates the distinct pin numbers (e.g., circled in the second and third columns).

In at least some exemplary embodiments, the exemplary disclosed apparatus may include a first controller (e.g., controller 320) including a plurality of contactors, each of the plurality of contactors configured to be selectively connected to a connector of a user interface, a plurality of electrical relays (e.g., relays 355) that may be connected to the plurality of contactors, a second controller (e.g., controller 340) that may be connected to the plurality of electrical relays, the plurality of electrical relays connected between the first controller and the second controller, and a user device or a network component that transfers control data to the second controller. The exemplary disclosed user device or the network component may include an external device that may pass control commands to controller 340, including for example a use case of voice command, computer vision, and/or AI for gesturing that may be embedded locally in system 300. The second controller may control the plurality of electrical relays to provide input to the first controller via the plurality of contactors based on the control data. The user interface may be a keypad and the plurality of contactors may be a plurality of pins disposed on a keypad connector of the first controller. The exemplary disclosed apparatus may further include a vending machine, wherein the user interface may be a keypad disposed on a surface of the vending machine, and the connector of the keypad may be disconnected from the plurality of contactors of the first controller that is disposed within the vending machine. The connector of the user interface may include a plurality of keypad pins, each of the plurality of keypad pins may be configured to connect to a different one of the plurality of contactors, and the connector may be disconnected from the plurality of contactors. Each of the plurality of electrical relays may be connected to the different one of the plurality of contactors, and the plurality of electrical relays is configured to provide an identical input to the first controller as the plurality of keypad. Each of the plurality of electrical relays may include a common terminal, which may be connected to a general purpose outlet of the second controller, and at least one of a normally open terminal and a normally closed terminal that may be connected to a different one of the plurality of contactors. Each of the plurality of electrical relays may selectively switch between a first position that allows a signal to be emitted to the different one of the plurality of contactors and a second position that blocks the signal to be emitted to the different one of the plurality of contactors. The exemplary disclosed apparatus may also include a second plurality of relays, wherein the plurality of electrical relays may be connected to the plurality of contactors via the second plurality of relays, and the connector of the user interface may include a plurality of pins that are connected to the second plurality of relays.

In at least some exemplary embodiments, the exemplary disclosed method may include controlling an assembly using a first controller (e.g., controller 320), selectively connecting a user interface connector of a user interface of the assembly to a terminal of the first controller, selectively connecting a relay connector of an electrical relay assembly (e.g., relay assembly 335) to the terminal of the first controller, connecting the electrical relay assembly to a second controller (e.g., controller 340) so that the electrical relay assembly is selectively connected between the first controller and the second controller, and controlling the electrical relay assembly with the second controller to provide input to the first controller when the relay connector is connected to the terminal. The exemplary disclosed method may also include providing a first input signal or input data from the electrical relay assembly to the first controller based on controlling the electrical relay assembly with the second controller based on a control data that is received at the second controller. The exemplary disclosed method may further include providing a second input signal or input data from the user interface to the first controller, wherein the second input signal or input data may be identical to the first input signal or input data. The user interface connector, the terminal of the first controller, and the relay connector may each include a same number of contacts. The user interface may include a keypad, the terminal may be a keypad connector including a cavity, and both the user interface connector and the relay connector may each be configured to be interchangeably received in the cavity. When the user interface connector is received in the cavity and the relay connector is not received in the cavity, the same number of contacts of the user interface connector and the terminal may contact each other, and when the relay connector is received in the cavity and the user interface connector is not received in the cavity, the same number of contacts of the relay connector and the terminal may contact each other. The same number of contacts may be equal to or greater than the sum of a number of rows (e.g., R1-R4 or any other suitable number of rows) and a number of columns (e.g., C1-C4 or any other suitable number of columns) of a key arrangement of the keypad. For example in a 4×4 keypad, the sum of the number of rows and columns may be four rows plus four columns equals eight (e.g., or the sum may be six for a 3×3 keypad, or the sum may be seven for a 4×3 keypad). Also for example, the number of contacts may be greater than the sum of the number of rows and columns.

In at least some exemplary embodiments, the exemplary disclosed apparatus may include a machine assembly, a first controller (e.g., controller 320) including a plurality of contactors and disposed in the machine assembly, a user interface disposed on the machine assembly and having a user interface connector that is selectively connectable to the plurality of contactors, a plurality of electrical relays (e.g., relays 355) that are selectively connectable to the plurality of contactors via a relay connector; a second controller (e.g., controller 340) that is connected to the plurality of electrical relays, the plurality of electrical relays connected between the first controller and the second controller, and a user device or a network component that transfers control data to the second controller. The exemplary disclosed user device or the network component may include an external device that may pass control commands to controller 340, including for example a use case of voice command, computer vision, and/or AI for gesturing that may be embedded locally in system 300. The second controller may control the plurality of electrical relays to provide a relay input to the first controller based on the control data when the relay connector is connected to the plurality of contactors. The user interface may provide a user interface input to the first controller when the user interface connector is connected to the plurality of contactors. The relay input may be identical to the user interface input. The plurality of contactors may be a plurality of keypad connector pins, the user interface may include a keypad, and both the relay input and the user interface input may be identical keypress input identifying buttons of the keypad. The user interface connector may include a plurality of keypad pins, each of the plurality of keypad pins may be selectively connectable to a corresponding keypad connector pin, and each of the plurality of electrical relays may be selectively connectable to the corresponding keypad connector pins. The machine assembly may be a vending machine, the user device may be a mobile device, and the user interface may be a push-button keypad.

The exemplary disclosed system, apparatus, and method may provide an efficient and effective technique for control of an electronic device or assembly without physical contact to a user interface of the device. For example, the exemplary disclosed system, apparatus, and method may provide for relatively simple control of a device by eliminating physical touching of a user interface of the device. The exemplary disclosed system, apparatus, and method may allow a user to operate a machine or electronic device without touching the machine or device. The exemplary disclosed system, apparatus, and method may also prevent spread of disease (e.g., virus) by reducing or eliminating the the touching of a device by multiple users. The exemplary disclosed system, apparatus, and method may further allow for users to review or confirm input to a device prior to the device operating based on a user's input (e.g., may give a user an opportunity to correct an incorrect selection such as an incorrect selection made on a vending machine).

Figure 8:
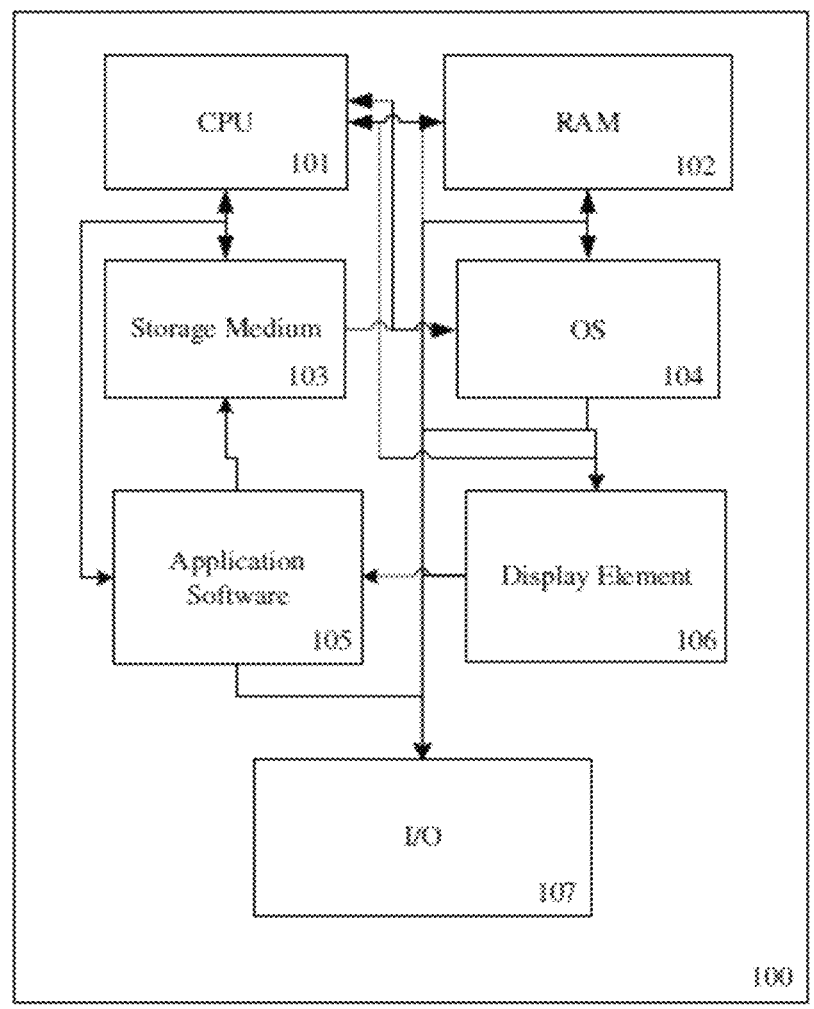
FIG. 8 is a schematic illustration of an exemplary computing device, in accordance with at least some exemplary embodiments of the present disclosure.

An illustrative representation of a computing device appropriate for use with embodiments of the system of the present disclosure is shown in FIG. 8. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wi-Fi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 9, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 9:
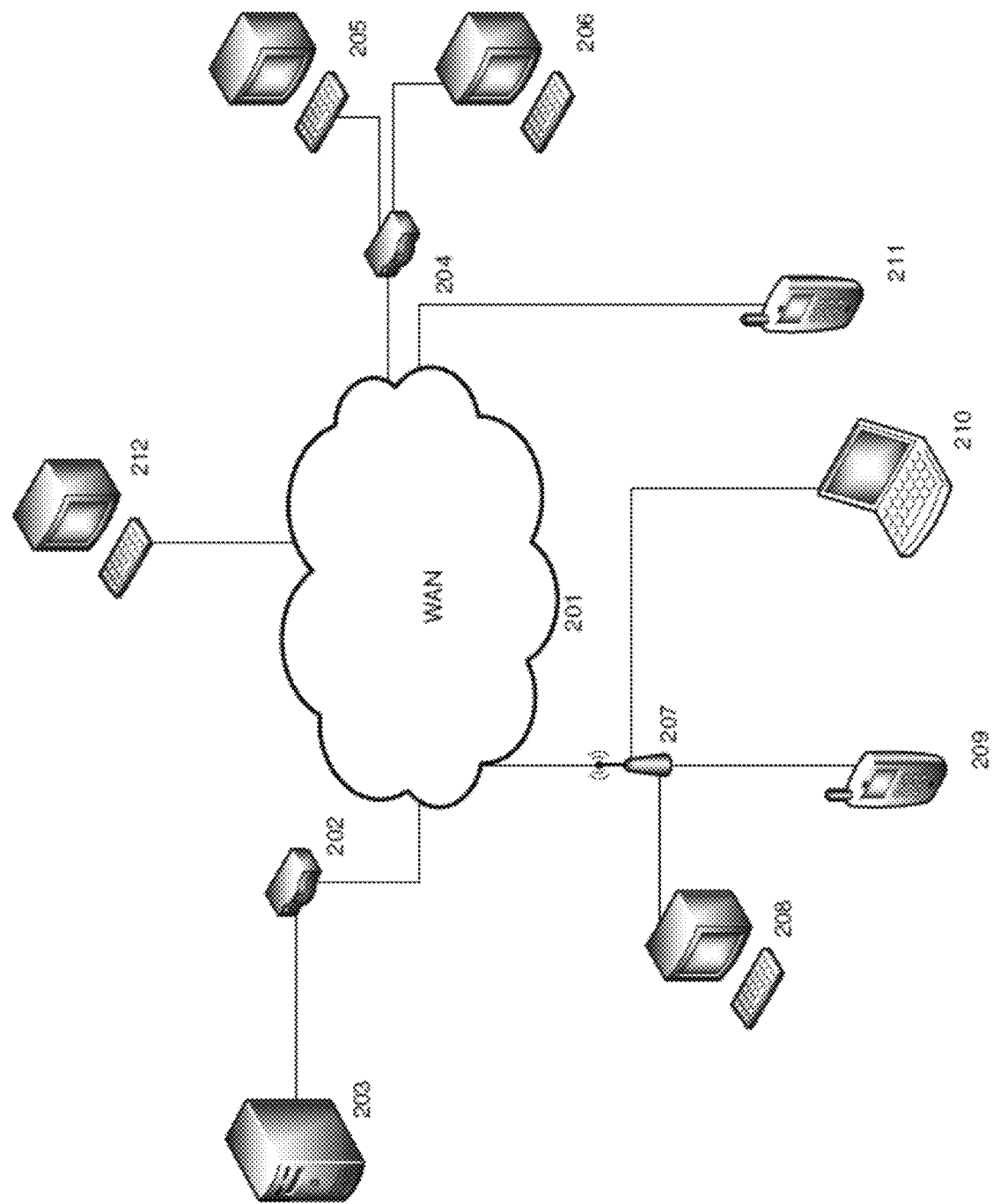
FIG. 9 is a schematic illustration of an exemplary network, in accordance with at least some exemplary embodiments of the present disclosure.

Referring to FIG. 9, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 9, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GSM, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including text, binary data, image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

The exemplary disclosed system may for example utilize collected data (e.g., user input provided to user device 345 and/or network component 350) to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary disclosed system may utilize neural network-based artificial intelligence to predictively assess risk. For example, the exemplary neural network may include a plurality of input nodes that may be interconnected and/or networked with a plurality of additional and/or other processing nodes to determine a predicted result (e.g., a location as described for example herein).

For example, exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. For example, the prediction algorithms and approach may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets. Also for example, exemplary artificial intelligence processes may include processing for training a machine learning model to make predictions based on data collected by the exemplary disclosed sensors.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation Kotlin, Swift, C#, PHP, C, C++, Assembler, Java, HTML, JavaScript, CSS, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of mobile applications, firmware for monitoring devices, web-based computer software, and so on, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An apparatus, comprising:
    a first controller including a plurality of contactors, each of the plurality of contactors configured to be selectively connected to a connector of a user interface;
    a plurality of electrical relays that are connected to the plurality of contactors;
    a second controller that is connected to the plurality of electrical relays, the plurality of electrical relays connected between the first controller and the second controller; and
    a user device or a network component that transfers control data to the second controller;
    wherein the second controller controls the plurality of electrical relays to provide input to the first controller via the plurality of contactors based on the control data; and
    wherein each of the plurality of electrical relays includes a control terminal, which is connected to a general purpose outlet of the second controller, and at least one of a normally open terminal and a normally closed terminal that is connected to a different one of the plurality of contactors.

2. The apparatus of claim 1, wherein the user interface is a keypad and the plurality of contactors is a plurality of pins disposed on a keypad connector of the first controller.

3. The apparatus of claim 1, further comprising a vending machine, wherein the user interface is a keypad disposed on a surface of the vending machine, and the connector of the keypad is disconnected from the plurality of contactors of the first controller that is disposed within the vending machine.

4. The apparatus of claim 1, wherein the connector of the user interface includes a plurality of keypad pins, each of the plurality of keypad pins is configured to connect to a different one of the plurality of contactors, and the connector is disconnected from the plurality of contactors.

5. The apparatus of claim 4, wherein each of the plurality of electrical relays is connected to the different one of the plurality of contactors, and the plurality of electrical relays is configured to provide an identical input to the first controller as the plurality of keypad pins of the connector that is disconnected from the plurality of contactors.

6. The apparatus of claim 1, further comprising a second plurality of relays, wherein:
    the plurality of electrical relays are connected to the plurality of contactors via the second plurality of relays; and
    the connector of the user interface includes a plurality of pins that are connected to the second plurality of relays.

7. The apparatus of claim 1, wherein each of the plurality of electrical relays selectively switches between a first position that allows a signal to be emitted to the different one of the plurality of contactors and a second position that blocks the signal to be emitted to the different one of the plurality of contactors.

8. A method, comprising:
    controlling an assembly using a first controller;
    selectively connecting a user interface connector of a user interface of the assembly to a terminal of the first controller, the terminal including a plurality of contactors;
    selectively connecting a relay connector of an electrical relay assembly to the terminal of the first controller, the electrical relay assembly including a plurality of electrical relays;
    connecting the electrical relay assembly to a second controller so that the electrical relay assembly is selectively connected between the first controller and the second controller;
    controlling the electrical relay assembly with the second controller to provide input to the first controller when the user interface connector is disconnected from the terminal and the relay connector is connected to the terminal; and
    transferring control data from a user device or a network component to the second controller;
    wherein each of the plurality of electrical relays includes a control terminal, which is connected to a general purpose outlet of the second controller, and at least one of a normally open terminal and a normally closed terminal that is connected to a different one of the plurality of contactors.

9. The method of claim 8, further comprising providing a first input signal or input data from the electrical relay assembly to the first controller based on controlling the electrical relay assembly with the second controller based on a control data that is received at the second controller.

10. The method of claim 9, further comprising providing a second input signal or input data from the user interface to the first controller;
    wherein the second input signal or input data is identical to the first input signal or input data.

11. The method of claim 8, wherein the user interface connector, the terminal of the first controller, and the relay connector each include a same number of contacts.

12. The method of claim 11, wherein the user interface includes a keypad, the terminal is a keypad connector including a cavity, and both the user interface connector and the relay connector are each configured to be interchangeably received in the cavity.

13. The method of claim 12, wherein the same number of contacts is equal to or greater than the sum of a number of rows and a number of columns of a key arrangement of the keypad.

14. The method of claim 12, wherein:
when the user interface connector is received in the cavity and the relay connector is not received in the cavity, the same number of contacts of the user interface connector and the terminal contact each other; and
when the relay connector is received in the cavity and the user interface connector is not received in the cavity, the same number of contacts of the relay connector and the terminal contact each other.

15. An apparatus, comprising:
a machine assembly;
a first controller including a plurality of contactors and disposed in the machine assembly;
a user interface disposed on the machine assembly and having a user interface connector that is selectively connectable to the plurality of contactors;
a plurality of electrical relays that are selectively connectable to the plurality of contactors via a relay connector;
a second controller that is connected to the plurality of electrical relays, the plurality of electrical relays connected between the first controller and the second controller; and
a user device or a network component that transfers a control data to the second controller;
wherein the second controller controls the plurality of electrical relays to provide a relay input to the first controller based on the control data when the relay connector is connected to the plurality of contactors;
wherein the user interface provides a user interface input to the first controller when the user interface connector is connected to the plurality of contactors; and
wherein each of the plurality of electrical relays includes a control terminal, which is connected to a general purpose outlet of the second controller, and at least one of a normally open terminal and a normally closed terminal that is connected to a different one of the plurality of contactors.

16. The apparatus of claim 15, wherein the machine assembly is a vending machine, the user device is a mobile device, and the user interface is a push-button keypad.

17. The apparatus of claim 15, wherein the relay input is identical to the user interface input.

18. The apparatus of claim 15, wherein the plurality of contactors is a plurality of keypad connector pins, the user interface includes a keypad, and both the relay input and the user interface input are identical keypress input identifying buttons of the keypad.

19. The apparatus of claim 18, wherein the user interface connector includes a plurality of keypad pins, each of the plurality of keypad pins is selectively connectable to a corresponding keypad connector pin, and each of the plurality of electrical relays is selectively connectable to the corresponding keypad connector pin so that the plurality of electrical relays corresponds to the plurality of keypad pins.

* * * * *